(12) United States Patent
Leichter et al.

(10) Patent No.: US 7,383,357 B2
(45) Date of Patent: Jun. 3, 2008

(54) IMPLEMENTING MANAGED NETWORK SERVICES FOR CUSTOMERS WITH DUPLICATE IP NETWORKS

(75) Inventors: Jerrold Leichter, Stamford, CT (US); Salvatore Desimone, Woodbury, CT (US)

(73) Assignee: EMC Corporation, Hopkinton, MA (US)

( * ) Notice: Subject to any disclaimer, the term of this patent is extended or adjusted under 35 U.S.C. 154(b) by 1110 days.

(21) Appl. No.: 10/124,881

(22) Filed: Apr. 18, 2002

(65) Prior Publication Data

US 2002/0165982 A1    Nov. 7, 2002

Related U.S. Application Data

(60) Provisional application No. 60/284,860, filed on Apr. 18, 2001.

(51) Int. Cl.
  *G06F 15/16* (2006.01)
  *G06F 15/173* (2006.01)
  *H04L 12/28* (2006.01)
  *H04L 12/56* (2006.01)

(52) U.S. Cl. ............... 709/249; 709/223; 709/224; 370/392

(58) Field of Classification Search ........... 709/223, 709/245, 224, 227–229, 249; 370/401, 392
  See application file for complete search history.

(56) References Cited

U.S. PATENT DOCUMENTS

| | | |
|---|---|---|
| 5,590,285 A | 12/1996 | Krause et al. |
| 5,651,006 A | 7/1997 | Fujino et al. |
| 5,715,394 A | 2/1998 | Jabs |
| 5,856,974 A * | 1/1999 | Gervais et al. ............. 370/392 |
| 5,917,997 A | 6/1999 | Bell et al. |

(Continued)

FOREIGN PATENT DOCUMENTS

JP    6197132 A2    7/1994

(Continued)

OTHER PUBLICATIONS

"Software Tool Helps Lucent Manage Customers' Networks," from www.bell-labs.com, May 1999, 3 pages.

(Continued)

*Primary Examiner*—Glenton B. Burgess
*Assistant Examiner*—Philip J Chea
(74) *Attorney, Agent, or Firm*—Krishnendu Gupta; Lindsay G. McGuinness

(57) ABSTRACT

A system and method is described for centrally managing private computer networks, each of which has a network element assigned the identical IP address. The networks are mapped into domains which each contains only network elements that have unique IP addresses. A separate virtual or physical interface at a management station is associated with each domain whereby management data is exchanged between the management station and a particular domain through a domain-specific interface that is assigned its own IP address. This IP address is inserted as the source address in data transmitted from the management station to the associated domain, thereby enabling a router to discern the domain to which the data should be routed. This IP address is also inserted as a destination address in data transmitted from a domain to the management station, thereby enabling the management station to discern from which domain the received data originated.

26 Claims, 6 Drawing Sheets

U.S. PATENT DOCUMENTS

| | | | |
|---|---|---|---|
| 5,923,854 | A | 7/1999 | Bell et al. |
| 5,930,257 | A | 7/1999 | Smith et al. |
| 5,951,650 | A | 9/1999 | Bell et al. |
| 6,061,349 | A | 5/2000 | Coile et al. |
| 6,175,867 | B1* | 1/2001 | Taghadoss ................ 709/223 |
| 6,222,842 | B1 | 4/2001 | Sasyan et al. |
| 6,343,064 | B1 | 1/2002 | Jabbarnezhad |
| 6,397,260 | B1* | 5/2002 | Wils et al. ................ 709/238 |
| 6,425,008 | B1* | 7/2002 | Lecheler et al. ........... 709/224 |
| 6,725,264 | B1* | 4/2004 | Christy ................ 709/225 |
| 6,931,437 | B2* | 8/2005 | Hariu ................ 709/218 |
| 2001/0039593 | A1 | 11/2001 | Hariu |
| 2002/0124066 | A1* | 9/2002 | Chang et al. ............. 709/223 |

FOREIGN PATENT DOCUMENTS

| | | |
|---|---|---|
| JP | 11266249 A2 | 9/1999 |
| JP | 20002244510 A2 | 9/2000 |
| JP | 2001268132 A2 | 9/2001 |
| WO | WO 00/49769 A | 8/2000 |

OTHER PUBLICATIONS

"An Efficient Method for Private Network Management Using IP Address Translation," Okazaki, N., Baba, Y., Ideguchi, T., Nakata, K., Park, M. R., Seno, S.; T. IEE Japan, vol. 121-C, No. 10, 2001. pp. 1562-1569.

"Economically managing multiple private data networks," Raz, D.; Sugla, B. Network Operations and Management Symposium, 2000; Apr. 10-14, 2000, pp. 491-504.

Raz D et al., "Economically Managing Multiple Private Data Networks," IEEE Conference Proceedings Article, Apr. 10, 2000, pp. 491-504.

* cited by examiner

FIG. 12

| DOMAIN | DEVICE NO. | TYPE OF DEVICE | STATUS |
|---|---|---|---|
| 1 | 10.0.0.8 | SWITCH | OK |
| 2 | 10.0.0.8 | ROUTER | HEAVY TRAFFIC |

CONSOLIDATED NETWORK MANAGEMENT SCREEN (300)

IMPLEMENTING MANAGED NETWORK SERVICES FOR CUSTOMERS WITH DUPLICATE IP NETWORKS

RELATED APPLICATION

This application is related to and claims the benefit of U.S. provisional patent application Ser. No. 60/284,860, filed Apr. 18, 2001 and entitled Implementing Managed Network Services for Customers with Duplicate IP Networks. The content of this provisional application is incorporated herein by reference.

FIELD OF THE INVENTION

This invention relates to a system and method for managing with a single management system multiple networks that use one or more identical IP addresses.

BACKGROUND OF THE INVENTION

The proliferation of computer networks has made it necessary to have some way of efficiently managing these networks. Many businesses have turned to outside service providers of Managed IP Network Services to manage their networks. Among other tasks, the service providers remotely monitor customers' networks for problems that may arise using a central management server (i.e., the "manager.")

In a network using the Internet Protocol (IP), the manager has a single IP address that is associated with a physical interface at the network element. Outgoing IP data packets ("datagrams") sent from the manager include this IP address as the source IP address. Incoming IP data packets received by the manager include this IP address as the destination IP address.

The managed networks (i.e., "agents" or "customer networks"), which are managed by the service provider, have network elements/devices, such as network servers, routers, switches, hubs, hosts, probes, etc. that each have an IP address identifier. The service provider must be able to address each of the network elements on the managed networks using the IP addresses of these network elements.

Service providers face a challenge in centrally managing multiple IP networks when some of the network elements in the various networks are assigned identical IP addresses. This is because network management applications and the IP protocol stacks on which they run operate under the assumption that IP addresses, are unique for each network element. This assumption is correct with respect to an individual customer's private network in which each machine does have a unique IP address. However, the assumption may be incorrect in a situation where a service provider remotely manages networks for multiple customers. Many of these customers may deploy private networks that each use certain identical ranges of addresses to identify their machines.

The use of duplicate IP addresses results from the IP address scheme. In this scheme, the notation "10.0.0.0" is the standard way of expressing an Internet address. Each of the four numbers in the address is internally stored as an 8 bit value, so each number may have a value from 0 to 255 inclusive. Addresses are generally used in contiguous ranges. The notation "10.0.0.0/8" describes those addresses whose top 8 bits are the number 10, and whose remaining (24) bits can be any other combination of numbers. Another commonly used terminology for such an address range is a "network number": 10.0.0.0/8 is "network 10".

While most Internet addresses are assigned by an international authority, and are only used for one machine in the entire world, several ranges—the 10.0.0.0/8 and 192.0.0.0/24 ranges among them—are explicitly left unassigned; they are generally referred to as private. Addresses in these ranges can be used for any machine, as long as the networks to which those machines are connected are configured so that the addresses do not "escape" to the greater Internet. It is these IP addresses that can be duplicated among networks. The Address Translation Gateways described below were designed to allow machines with addresses of this sort a way to communicate with the greater Internet.

A management application for managing multiple private networks operating in the presence of non-unique IP addresses must be able to recognize the distinct network elements that have duplicate IP addresses. If the network elements that share the same address could not be distinguished, a topology map at the service provider or elsewhere, which maps the network elements on the various networks, will incorrectly show that systems in each of the customer networks are connected, when, in reality, they are totally unrelated. Such phantom connectivity is the result of the systems sharing the same IP network number. As a result, data may be incorrectly routed to an unintended network element or may be unroutable due to the ambiguity in the intended destination.

Additionally, if a network management application polls one of multiple devices that are assigned the same IP address but are in different customer networks, the management application must be able to determine which of the multiple devices actually received the poll and sent a response that is received. The Simple Network Management Protocol (SNMP) (defined in RFC 1157 published by the IETF (Internet Engineering Task Force)), and the Internet Control Message Protocol (ICMP) (RFC 792), are two commonly-used protocols that permit polling.

Moreover, in a protocol, such as SNMP, a network element may send a notification to the network manager about a change in status of the device or about some event that has occurred without the manager first sending a request for this information. In SNMP, such a notification is referred to as an SNMP "trap". A management application must be able to tell which managed network generated a trap when the trap's source address is duplicated by multiple systems in different customer networks.

Managing networks with duplicate IP addresses has been cumbersome. There are two common prior art approaches that service providers have employed: one may be referred to as the "Hardware Method" and the other is the "Address Translation Gateways" method. Both of these approaches are work-arounds that eliminate (or at least minimize) the problem.

The so-called Hardware Method is a brute-force approach that tries to solve the problem with computer hardware. In this method, the service provider deploys multiple hardware platforms at the service provider each running a separate copy of the management application. Customer A's network is managed from one platform, customer B's network from another platform, and so on. Static routes are configured on each platform so that packets from the first hardware platform and management application go to customer A's network and packets from the second hardware platform and management application go to customer B's network.

This approach has two significant disadvantages. First, each new customer that comes online requires a new, dedicated hardware platform which greatly increases the cost. Second, the end result is multiple isolated management applications. This makes it difficult for the service provider to centralize operations management.

Another approach uses Address Translation Gateways to eliminate the address duplication. Using this approach, the service provider provides an address translation table at the gateways to translate the common addresses either to IP addresses assigned exclusively to the service provider, or to non-exclusive IP addresses. In the latter case, the service provider must isolate its management network from the greater Internet in the event that it duplicates someone else's addresses.

As an example of the Address Translation approach, assume customers A and B use the address range 10.1.0.0/16. A software translation table is set up that maps 10.1.0.0/16 for customer A to 11.1.0.0/16, which in this example is an IP address that is unique, i.e. not duplicated, in the managed networks and the management application. A similar table is set up for customer B that maps 10.1.0.0/16 to 12.1.0.0/16, another otherwise unused IP address. In the address translation method, the management application for managing the customer networks is unaware of the real IP addresses of the customer devices. Instead, the management application is told that customer A devices are in the range 11.1.0.0/16, and that customer B's devices are in the range 12.1.0.0/16. Static routes are set up on the management platform to route traffic for network 11.1.0.0/16 to a special-purpose hardware device that has unambiguous connectivity to customer A's network. A similar route to a second device is configured for customer B. The special-purpose hardware device uses the address translation table to translate packets sent to and received from the customer network.

Address translation works well only when the number of addresses that must be translated in any reasonably short interval of time is a small fraction of the potential addresses in the private network. It would be very difficult for a service provider to find enough addresses to "cover" all the addresses used by even a small number of customers with large networks. In fact, one reason to use shared addresses such as 10.0.0.0/8 is that it is difficult, if not impossible, for anyone to get large address range assignments under the IP address scheme that uses a set of four numbers. Additionally, a network management application by its very nature is likely to need to reach a large fraction of all hosts in the managed network on a regular basis. This would make the address translation method difficult to apply for network management even if all other problems could be solved.

These other problems include a requirement for special-purpose hardware platform to implement the address translation, so the address translation method does not eliminate the per customer hardware expenditure. Second, in using the SNMP protocol packet payload translation is required to translate the address from the common IP address contained within the payload of the IP packet. This ensures that no evidence of the customer's real IP addresses are seen by the management application, which may confuse the management application as to the source of the packet.

For example, management information base (MIB) tables at the special-purpose hardware device that performs address translation, like the MIB-2 ipAddrTable, contain keys or row values that represent IP addresses for network elements that are to be managed. The translator must intercept the response from a managed network to any poll for such a MIB variable. The IP address must then be located within the response payload of a packet and properly translated before the response may be sent to the management application. This processing introduces an unwanted runtime overhead that slows down polling. More importantly, the service provider must be aware of all MIB variables accessed by the management application in order to determine if any need to be translated. This creates an undesirable administrative overhead.

Perhaps the most crucial drawback to the address translation method is the fact that the management application is completely unaware of the real addressing scheme of the customer. Therefore, alarms that are generated for network failures or troubles have no meaning to operations staff without even more translation processes that can manipulate the notifications coming out of the management application.

In view of the shortcomings of the prior art, it would be advantageous to have a better solution to managing multiple private networks that use common IP addresses. Such a solution should:

(1) allow a service provider who provides the management application to manage identically addressed customer networks from a single management hardware platform;

(2) not require the service provider to deploy customer-specific hardware elements;

(3) permit the isolation of the customer network topologies, even though they occupy the same IP address space;

(4) report failures using the native addressing of the customer networks; and (5) permit the use of SNMP and ICMP polling originating from the single hardware platform, as well as the unambiguous processing of incoming traps received on the single hardware platform, without ambiguity due to the overlapping IP addressing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

It is an object of the invention to provide a centralized IP management application from which multiple private networks that use identical IP addresses can be managed.

It is a further object of the invention to provide a centralized IP management application for customer networks that does not require customer-specific hardware or special-purpose hardware for performing address translation.

To achieve these objectives, a management system in accordance with the present invention manages computer networks that are mapped (assigned) to plural domains. Each managed domain comprises network elements that are assigned a unique IP address within the domain at a given time, and at least one of the network elements in each of at least two domains have identical IP addresses. The management system comprises a management station that has a plurality of interfaces, which interfaces may comprise physical interfaces, virtual interfaces, or a combination of one or more physical and virtual interfaces. The management system also comprises a management application for communicating with the plurality of virtual interfaces.

The management application is configured to associate a first of the domains with a first of the interfaces and to associate a second of the domains with a second of the interfaces. Data to be exchanged between the management application and the first domain will thereby be transmitted exclusively through the first interface, and data to be exchanged between the management application and the second domain will thereby be transmitted exclusively through the second interface. Data, such as a network management request, that is to be transmitted from the management application to a particular one of the first and second domains is therefore forwarded to the interface that is associated with the particular domain. A source IP address, which is the assigned IP address of the interface, is inserted into the data at the interface. The addressed data may then be transmitted to the particular domain, such as with a router.

Where policy-based routing is implemented at the router, the router is provided with routing information to route the data comprising the source IP address to the particular domain based on the source IP address. Where source routing is used, the router need not be configured to route the data to the particular domain because routing instructions are inserted into the data at the management station.

The network element receiving this data may send responsive data to the management station, using the IP address of the network element as the source IP address of the responsive data and using the source IP address in the received data as a destination IP address in the responsive data. By including the source IP address as the destination IP address in the responsive data, the responsive data can be routed back to the interface associated with the particular domain in which this network element is located. The management application can thereby ascertain from which domain the responsive data originated based on the interface at which the responsive data is received even where network elements in different domains are assigned the identical IP address. The management application also ascertains which network element sent the data from the source IP address in the responsive data.

The domains themselves may also be configured to include a destination address in data that is transmitted from a network element to the management application, the destination address being the IP address of the interface at the management station that is associated with the domain from which the data is transmitted. In this manner, data such as an SNMP trap that is sent to the management station but that is not sent in response to a request from management station may be routed to the interface that is associated with the domain from which the data is transmitted. The management application can thereby ascertain from which domain the data originated based on the interface at which the data is received (as determined from the destination address) and which particular network element sent the data from an IP address that is provided as a source address in the received responsive data.

BRIEF DESCRIPTION OF THE DRAWINGS

In the drawings, wherein like reference numerals denote similar elements through out the several views:

FIG. 12 is an example of a representation of a possible screen on which is displayed a consolidated table of management information obtained from multiple domains.

DETAILED DESCRIPTION OF THE PREFERRED EMBODIMENT

Figure 1:
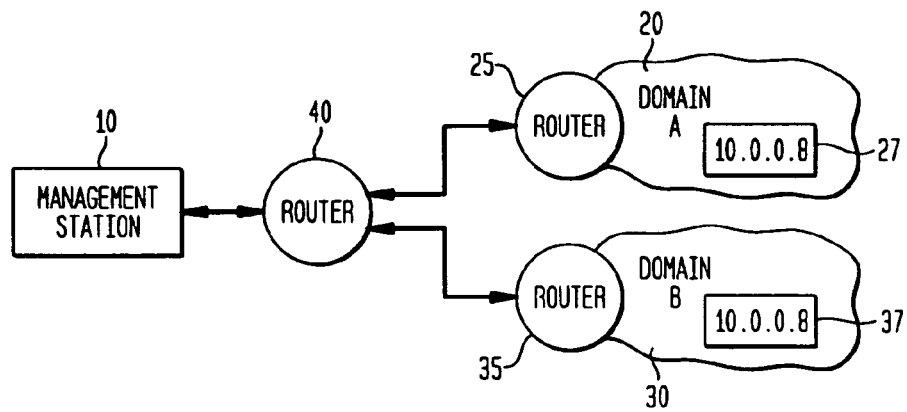
FIG. 1 is a block diagram depicting a system for managing multiple private networks in accordance with one embodiment of the present invention.

Referring to FIG. 1, a centralized IP network management system in accordance with an illustrative embodiment of the present invention includes a management station 10, such as a server, that manages IP Management Domains, such as domain A 20 and domain B 30. In the illustrated example, both domains A and B have a respective device 27, 37 whose IP address is 10.0.0.8.

Figure 2:
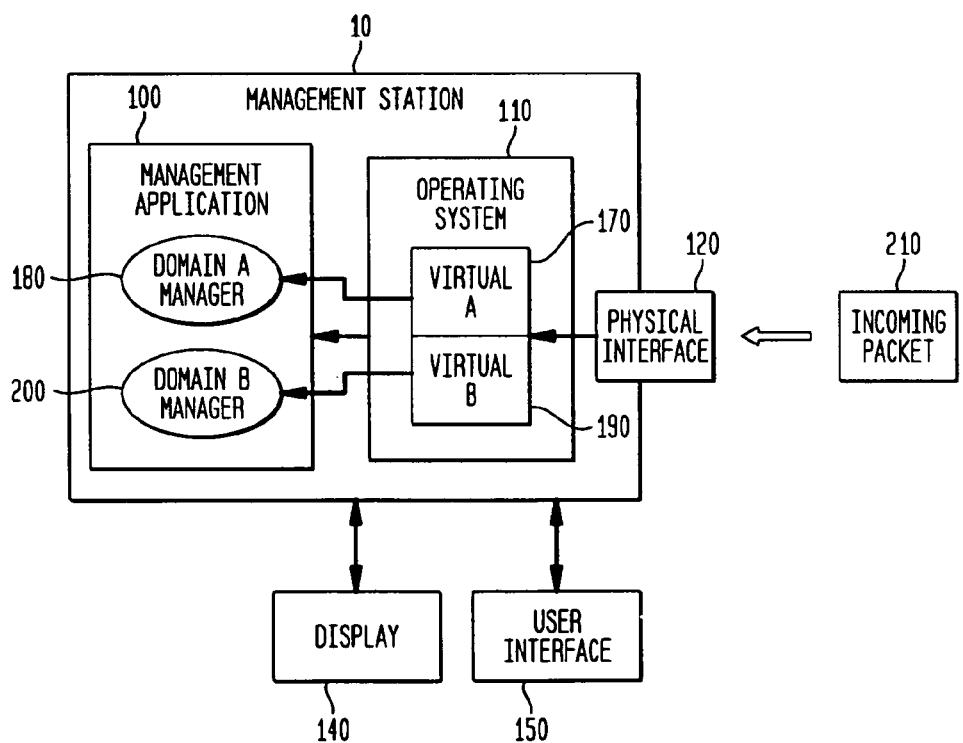
FIG. 2 is a block diagram of the management station of FIG. 1 indicating possible paths of IP data packets delivered to a management application that includes separate domain managers for each domain.

As shown in FIG. 2, management station 10 comprises a management application 100 that comprises software for network management, an operating system 110, and a physical interface 120 that is in communication with operating system 110 and through which data is routed between domains 20, 30 and management station 10. Physical interface 120 may be associated with a physical IP address that is one IP address that may be used to communicate with management station 10. Management station 10 also has a display 140 on which selected network management information can be displayed and a user interface 150.

Each domain may have a router through which IP data packets are routed to and from a particular domain. In the example of FIG. 1, router 25 is the router through which communications are routed between management station 10 and domain A 20. Router 35 is the router through which communications are routed between management station 10 and domain B 30. All communications to and from all domains pass through a central router 40 located between routers 25, 35 and management station 110.

A "domain" is defined, for purposes of the present invention, as an IP network or a set of IP networks that do not contain overlapping IP address spaces at a given time. In other words, by definition, a domain can only contain network elements that have unique IP addresses within that domain.

Network elements/devices in the managed networks are mapped to a particular one of the domains at management station 10. More than one network may be mapped to a single domain as long as all network elements in that domain have unique IP addresses. Thus, if, for example, two customers, A and B, both use the private IP network number 10.0.0.0/8, customer A's network would be mapped to one management domain, domain A 20, while customer B's network would be mapped to a second domain, domain B 30. The combination of domains A and B cannot be a domain itself since they both domains A and B use the 10.0.0.0/8 network number. It should be understood that although only two managed domains are shown in FIG. 1, management station 10 may centrally manage any number of domains.

It should be further understood that devices in a particular domain may implement the Hot Standby Routing Protocol (HSRP) (RFC 2281) in which a first device in a network has a primary IP address and may also have a secondary IP address that is identical to the primary IP address of a second device in the network. The secondary IP address on the first device is inactive and on standby when the second device is functioning. When the second device fails, however, the secondary IP address on the first device becomes active so that the first device temporarily takes over the functions of the second device. As a result, at any given time, only one device in a managed domain has a particular IP address active. Therefore, the IP addresses of the devices in that network always points to only a single device at a given time. Thus, a network implementing HSRP may also be managed by management station 10 in accordance with the present invention.

The mapping of networks to domains occurs during the "discovery process" in which the management application 100 determines the network configurations in a customer's network, such as what machines are in the customer's network and the components in those machines. The mapping may be performed automatically with, for example, SNMP or ICMP polling, or may be based on customer-provided information. The results of the mapping are recorded at the management station 10. Due to the mapping, management application 100 can assume that IP addresses within a domain are unique. Topology information for the systems and networks in each domain are kept isolated in memory 130, so there is no phantom connectivity between devices in different domains, even if they share the same IP network addresses.

The particular operating system that is used at management station 10 may be any operating system that provides the required configuration support. Thus, in an embodiment where virtual interfaces are used, the operating system 110 hosting the management application 100 must support virtual interfaces. A number of operating systems, such as Unix, support the creation of such virtual IP interfaces.

For example, in one version of Unix, viz. the Solaris operating system version 8 from Sun Microsystems, a virtual interface (or "logical interface") may be created and assigned a virtual IP address (referred to by Sun as a "virtual IP"). To create a virtual interface with a virtual IP address of 192.9.200.1/24 on a physical interface le0 in this operating system, for example, one would allocate the next available logical unit number on the le0 physical interface and assign an IP address and prefix_length (netmask) with the following statement: ifconfig le0 addif 192.9.200.1/24 up.

In the embodiment of FIG. 2, the administrator configures (establishes) in the operating system 110 a separate virtual interface—Virtual A interface 170 and Virtual B interface 190 in this example—for each domain. Each virtual interface is assigned a separate "virtual" IP address, which is an IP address that is unique to the management station and the managed domains. One of the virtual IP addresses may be the IP address of physical interface 120.

Figure 3:
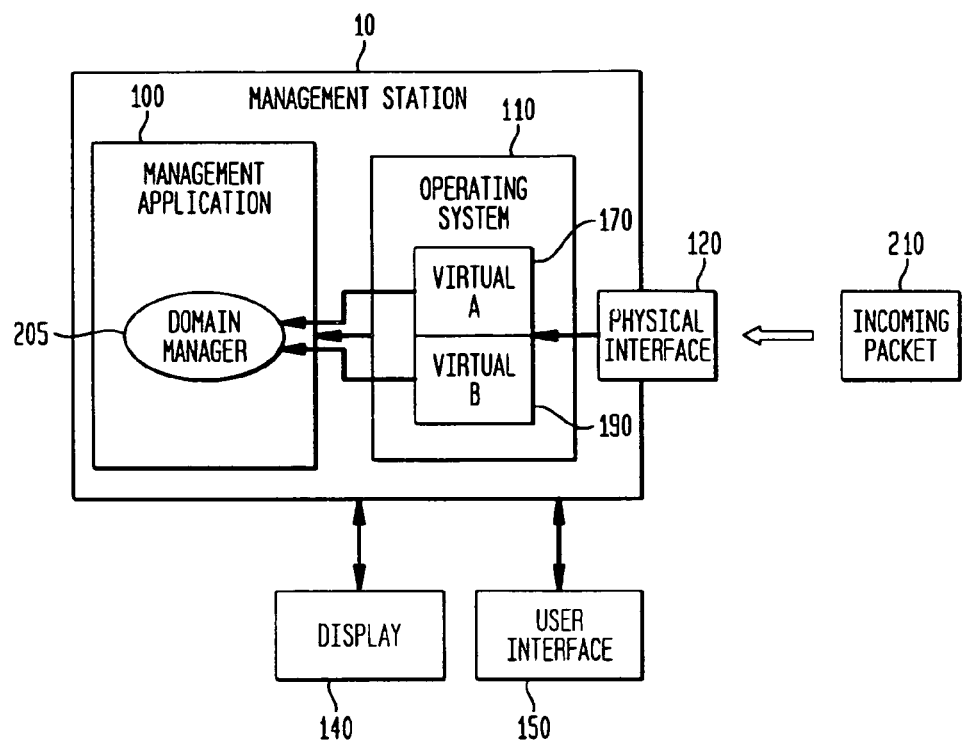
FIG. 3 is a block diagram of the management station of FIG. 1 indicating possible paths of IP data packets delivered to a management application that includes a central domain manager for the domains.

One or more domain managers are created in management application 100 to manage the domains. Separate domain managers 180, 200 may be configured in management application 100 for each virtual interface, as shown in FIG. 2. Alternatively, as shown in FIG. 3, a single domain manager 205 may be configured in management application 100 to centrally manage multiple domains 20, 30.

The administrator then binds ("associates") in management application 100 a domain to a particular virtual interface by specifying that a particular domain manager 180 in management application 100 receive and send all packets for the domain it manages through the virtual interface to which it is bound. For example, as shown in FIG. 2, domain A 20 may be bound to Virtual A interface 170 and domain B 30 may be bound to Virtual B interface 190. By binding a domain to a virtual interface, data exchanged between management application 100 and domain A 20 is exclusively transmitted through virtual A interface 170, and data exchanged between management application 100 and domain B 30 is exclusively transmitted through virtual B interface 190.

Because there is a separate virtual interface for each domain, management application 100 can ascertain from which domain the incoming packet originated based on the virtual interface at management station 10 at which the incoming data arrived. Management application 100 can thereby distinguish which of two or more devices located in different domains, but having a common IP address, sent the packet.

After the domains are bound to the respective interfaces, all data packets transmitted by a network element in domain A to management application 100 will be routed through router 40 to what may be a single physical interface 120 linked to router 40. The operating system 110 will then forward the data to Virtual A interface 170 based on the destination IP address in the header of the data packet, and the data is then forwarded to domain manager 180 in management application 100. Similarly, all data packets transmitted by a network element in domain B to management application 100 will be routed through router 40 to physical interface 120. The operating system 110 will then forward the data to Virtual B interface 190 based on the destination IP address in the data packet, and the data is then forwarded to domain manager 200.

Figure 4:
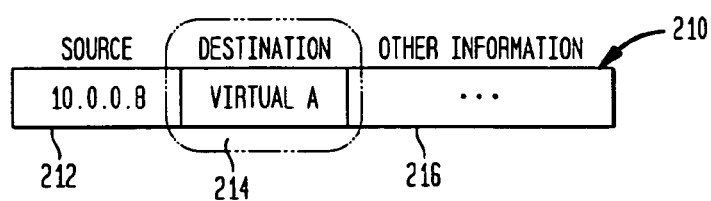
FIG. 4 is a representation of an IP data packet that is delivered to the management application of FIG. 2.

For example, referring to FIG. 2, an incoming packet whose IP destination address is "Virtual A" is interpreted in the context of domain A 20, i.e., as having been sent from a device in domain A 20. This packet is forwarded to Virtual A interface 170 and then to domain A manager 180. An example of such a packet 210 is shown in FIG. 4 in which a packet sent from domain A 20 has in its header a source IP address 212 "10.0.0.8" and a destination virtual IP address 214 "Virtual A", and also has various other information in the packet 216 whose particulars are not significant for purposes of the present invention. Similarly, a response or trap whose destination address specifies virtual IP address "Virtual B" 190 is interpreted in the context of domain B 30, i.e., as having been sent from a device in domain B 30. Incoming traps from identically addressed devices in domains A and B are therefore distinguishable by the packet destination address. It is therefore unnecessary to track over which link the data arrived at router 40 in order to determine from which domain the data originated.

By using separate virtual interfaces for each domain, management application 100 can also properly route outgoing packets, such as SNMP and ICMP network management requests, to the proper device in the appropriate domain, even if devices in more than one domain share a common IP address. Requests directed to devices in domain A 20 are forwarded by management application 100 to virtual A interface 170. Requests directed to devices in domain B 190 are forwarded by management application to virtual B interface 190. At the virtual interface, the IP address of that particular virtual interface is inserted into the packet in the packet header as the source IP address. Thus, requests directed to domain A 20 specify "Virtual A" as the source IP address. Requests directed to devices in Domain B specify Virtual B as the source IP address. So two packets destined for identically addressed devices in domain A and domain B are differentiated at least by the source IP address in the packet.

A packet may be routed, in accordance with the present invention, from management station 10 to one of the domains, such as domain A or domain B, in various ways. One way is to use a policy-based router 40 in which the packet is forwarded by the router to a specific destination. For example, router 40 may utilize the Multiprotocol Label Switching (MPLS) protocol (RFC 3031) in which a specific path is set up for a sequence of packets. In MPLS, a label is inserted by router 40 into the packets to indicate that they are that are to follow this predetermined path. As another example of a policy-based router, router 40 may utilize the Border Gateway Protocol (BGP) (RFC 1771) to generate routing tables at router 40.

Figure 5:
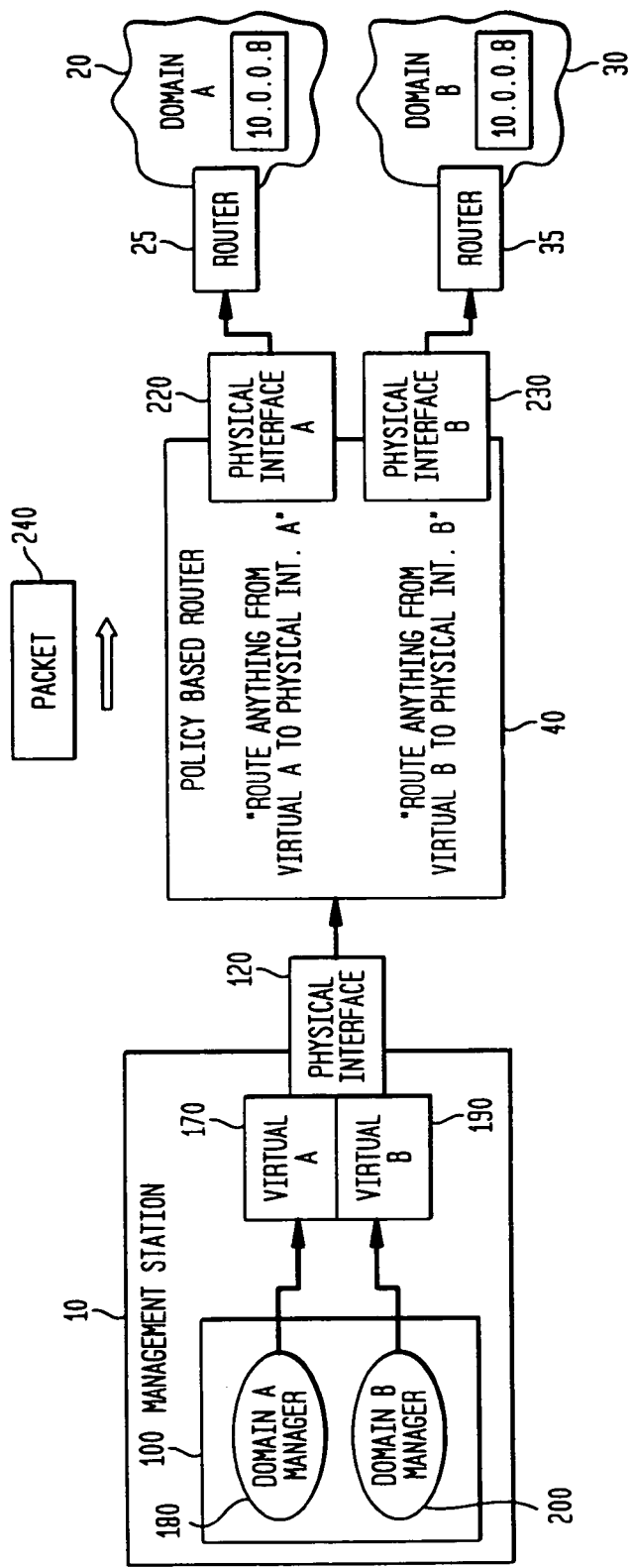
FIG. 5 is a block diagram of the management system of FIG. 1 where the router for routing packets from the management application to the domains is a policy-based router.

As shown in FIG. 5, a policy-based router 40 has a separate physical interface 220, 230 for each of the domains A 20 and B 30. Router 40 forwards all packets addressed to domain A out of physical interface A 220 and to router 25 through which traffic enters domain A 20. Router 40 forwards all packets addressed to domain B out of physical interface B 230 to router 35 through which traffic enters domain B 30. Router 40 determines to which domain a particular packet is to be routed based upon the source IP address in the packet, which, as explained above, is the IP address of the interface from which the packet was transmitted. If the source IP address is Virtual A, the packet is routed to domain A 20. If the source IP address is Virtual B, the packet is routed to domain B 30. By allotting a separate physical interface at router 40 to each domain, there is unambiguous connectivity to the networks of customers A and B, respectively.

Figure 6:
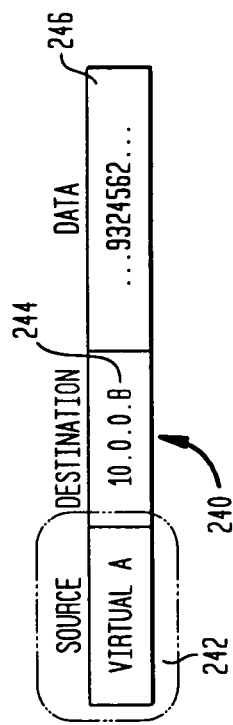
FIG. 6 is a representation of an IP data packet that is sent from the management application to domain A.

Using a policy-based router, a packet originating from the management station 10 destined for network 10.0.0.0/8 whose source address is "Virtual A" is forwarded out of physical interface A 220 of router 40 along a first route. An example of a packet 240 directed to domain A 20 is shown in FIG. 6 in which the source address 242 is the "Virtual A" IP address, the destination address 244 is 10.0.0.8 and the other data is the packet is represented as a single field 246. A second route is defined for packets sent to domain B. Packets whose source address is "Virtual B" are forwarded to domain B out of physical interface B 230 of router 40.

Another routing technique uses either loose or strict source routes to route packets between management station 10 and the various domains. In source routing, routing instructions are placed within the packet itself This has the advantage that it requires no special configuration of the routers.

Figure 7:
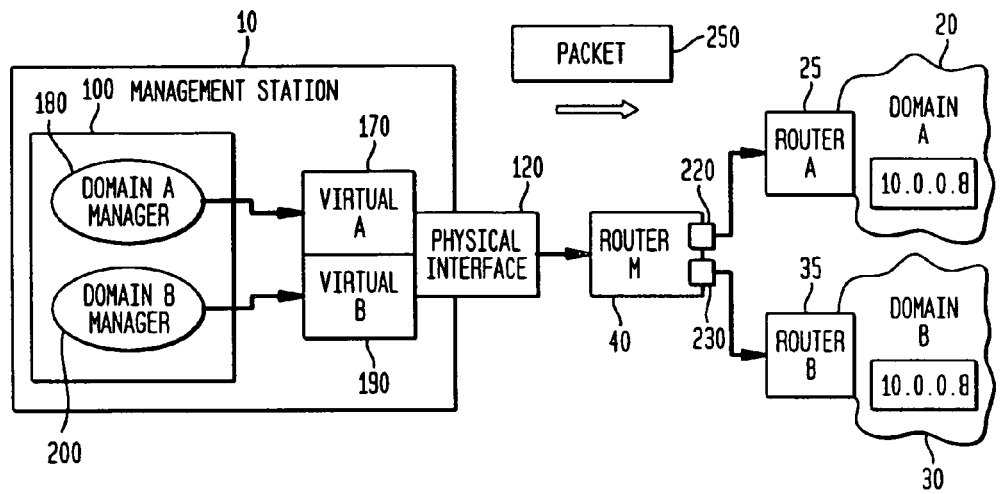
FIG. 7 is a block diagram of the management system of FIG. 1 in accordance with a second embodiment of the present invention where source routing is used to route packets from the management application to the domains.

FIG. 7 shows an example of an embodiment in which source routing is used. Routing instructions are added to the packets 250 leaving management station 10. Each packet 250 arrives at a router M 40 with instructions about the packet's next destination. When the instructions are exhausted, the packet will be in a location where a standard routing mechanism within the domain can complete the packet's delivery using the IP destination address in the IP packet. A response to a polling request, such as an SNMP response, generated at a customer network may be routed back to the appropriate virtual interface from which the polling request originated over any available route.

Figure 8:
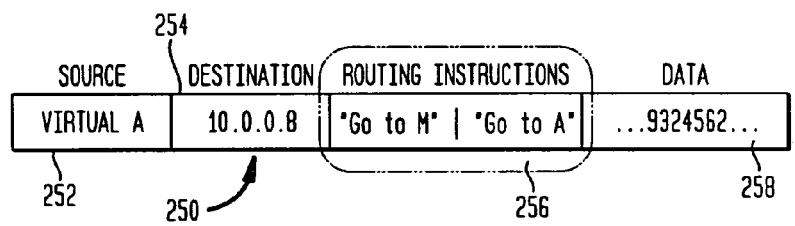
FIG. 8 is a representation of an IP data packet that is sent from the management application to domain A in the embodiment of FIG. 7.
Figure 9:
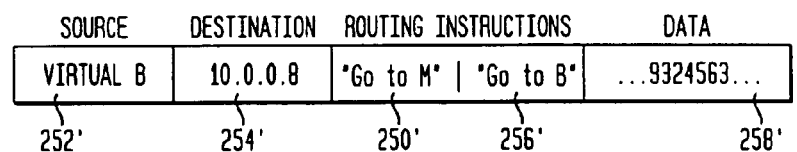
FIG. 9 is a representation of an IP data packet that is sent from the management application to domain B in the embodiment of FIG. 7.

In source routing, specific routes between the management station 10 and a particular customer network are known in advance at management station 10. Routing instructions for the specific route to a particular domain are placed within the packet as shown in FIG. 8. For example, packet 250 to be sent to domain A 20 comprises a source address 252 "Virtual A", a destination address 254 10.0.0.8, routing instructions 256 to route the packet first to router M 40 and then to router A 25, and various other data 258. Referring to FIG. 9, packet 250' to be sent to domain B 30 comprises a source address 252' "Virtual B", a destination address 254' 10.0.0.8, routing instructions 256' to route the packet first to router M 40 and then to router B 35, and various other data 258'. Therefore, in source routing, router 40 need not be configured to ascertain to which domain to route a packet from management station 10 based on the source IP address.

Responses to the network management requests can automatically be sent by the polled network elements to the right virtual interface destination because, using standard IP routing, the responses are sent to the source IP address of the query that initiated them. For example, using SNMP, a device that is responding to a network management request inserts as the destination address of the response the source address of the request. The response to a request that contained a virtual IP address as the source address will therefore contain the virtual IP address as the destination address to a response, and the response will therefore be properly routable to the appropriate domain manager.

Thus, referring to FIG. 5, packets sent by the customer networks in domains A or B in response to a request from management application 10 are routed through physical interface A 220 or physical interface B 230, respectively, to the appropriate interface on management station 10. However, because the packets contain a destination address, router 40 need not track through which physical interface the packets are received in order to route them to the proper virtual interface.

Data, such as a trap, may, however, be sent without being requested. Therefore, the devices in a particular domain must be configured to send data, such as the traps, to the virtual interface to which that domain is bound. This is achieved by configuring the domain to insert the proper destination virtual IP address into a packet transmitted from a device in a particular domain so that the packet is directed to the appropriate virtual interface. In the example of FIG. 1, devices in customer A's network are configured to send traps to the virtual IP address "Virtual A", and devices in customer B's network are configured to send traps to "Virtual B".

Figure 10:
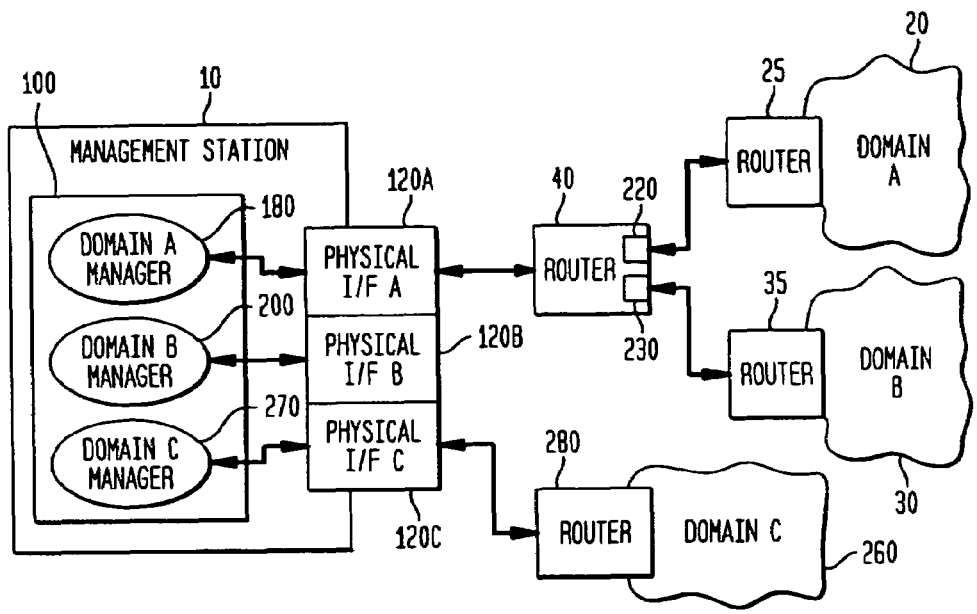
FIG. 10 is a block diagram of a third embodiment of the present invention in which plural physical interfaces at the management station are each assigned a distinct IP address.

In another embodiment of the present invention shown in FIG. 10, instead of providing multiple virtual interfaces, multiple physical interfaces 120A, 120B, 120C may be provided at management station 10. Each physical interface 120A, 120B is assigned a separate IP address, and is bound to a respective one of domains A 20, B 30, and C 260. Where there are separate domain managers 180, 200, 270 for each domain, incoming packets addressed to the IP address of a particular physical interface are forwarded to the respective domain manager in management application 100 associated with that physical interface. As with the virtual interfaces, the domain from which a packet is sent to management application 10 can be determined from the destination IP address in the packet. Packets sent from a respective domain manager to a network element in the managed domain are provided with a source IP address corresponding to the IP address of the physical interface associated with the domain to which the packet is sent.

While data for domains A 20 and B 30 is routed through router 40, domain C 260 may be directly linked to management station 10 through physical interface C 120C. In this case, data transmitted from domain manager 270 to domain C 260 is routed though a router 280 directly to domain C 260 without being routed through router 40.

Figure 11:
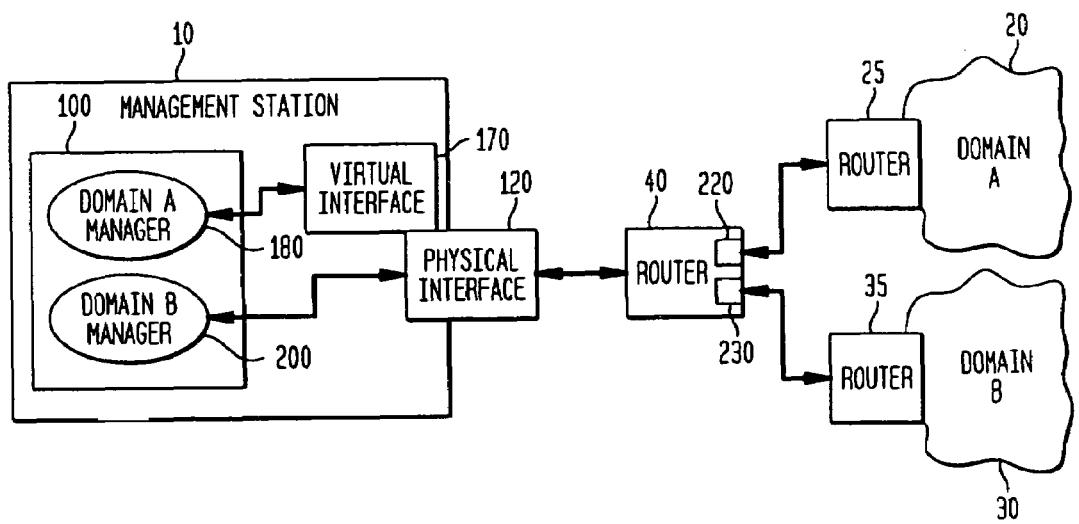
FIG. 11 is a block diagram of a fourth embodiment of the present invention in which a combination of virtual and physical interfaces at the management station are each assigned a distinct IP address.

FIG. 11 shows another embodiment in which a combination of virtual and physical interfaces 120, 170 are used to provide individual IP addresses at management station 10 each of which can be bound to a particular domain. It will be understood that this embodiment operates analogously to the embodiments described above except that domain A 20, for example, is bound to a virtual IP address and domain B 30 is bound to a physical IP address. Therefore, incoming packets are forwarded to a particular domain manager based on whether they are received at physical interface 120 or virtual interface 170. Packets sent from a respective domain manager to a network element in the managed domain are provided with a source IP address corresponding to the IP address of the physical or virtual interface, as appropriate, that is associated with the domain to which the packet is sent.

Once the IP Management Domains have been defined, and the virtual interfaces and policy routes, if any, are established, management application 100 can correctly monitor and correlate the information for each domain. No address translation of the source address of a response or trap is needed because management application 100 knows from the received packet the actual source address as well as the domain from which the packet was sent. Moreover, the customer network topologies are correctly mapped as isolated networks without any confusion that may otherwise result from the use of duplicate IP addresses.

A separate session of the management application software may be opened for each domain. For example, a first software session manages domain A with domain manager 180 and a second software session manages domain B with domain manager 200. Alternatively, the management application software may be designed to consolidate management of all IP Management Domains in a single session of the software. In either case, the management application software may be implemented from a single hardware platform.

The network management data collected from the responses and traps is then analyzed. A root-cause and impact analysis, which determines the probable causes of problems and their impacts, may be performed by the management application software for each domain.

When a problem, such as a failure, at one of the managed devices is detected, an alarm may be displayed (or sound, etc.) at display 140 at the service provider. The operator may be provided with isolated alarm displays that each shows the information for a specific domain. Or the operator may be provided with a single alarm display that consolidates the information for all domains in a single table 300, as shown in FIG. 12.

In the latter case, table 300 may comprise a first column that identifies the domain of that device as determined from the virtual interface at which the packet arrived and a second column that indicates the actual IP address of the device that triggered the alarm, which is captured directly from the received packet at management station 10. There is therefore no ambiguity about which device has triggered the alarm where devices in different domains have the identical IP address. Other columns in table 300 may, for example, identify the type of device being monitored and the status of the device.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit and scope of the invention.

What is claimed is:

1. A system for managing a plurality of computer networks mapped to a plurality of domains, each domain comprising a plurality of network elements that are each assigned a unique IP address within the domain at a given time, and at least one of the plurality of network elements within each of at least two of the plurality of domains is assigned an identical IP address, the system comprising:
   a management station comprising:
   a plurality of interfaces established at the management station, each of the plurality of interfaces being one of a virtual interface, a physical interface or combinations thereof, each of said interfaces being assigned a different IP address; and
   a management application for communicating with the plurality of interfaces; wherein the management application is configured to
      (a) associate a first of the plurality of domains with a first of the plurality of interfaces,
      (b) associate a second of the plurality of domains with a second of the plurality of interfaces, and
      (c) transmit first data to a particular one of the first and second domains by transmitting the first data to a particular one of the first and second interfaces that is associated with the particular one of the first and second domains to which the first data is to be transmitted,
   wherein the management station is configured to insert in the first data a source IP address, that is specified by the management station, which is the assigned IP address of the particular one of the first and second interfaces such that no address translation is required; and
   a router comprising routing information to route the first data to the particular one of the first and second domains based on the source IP address in the first data, said router being in communication with the management station.

2. The system of claim 1, wherein the management application is further configured to insert routing instructions in the first data.

3. The system of claim 1, wherein second data that is sent in response to the first data comprises a destination IP address which is the source IP address of the first data wherein the management station is further configured to transmit the second data to a particular one of the first and second interfaces corresponding to the destination IP address, and wherein the management application is further configured to ascertain from which of the plurality of domains the second data is transmitted based on which of the first and second interfaces receives the data.

4. A system for managing a plurality of computer networks mapped to a plurality of domains, each domain comprising a plurality of network elements that are each assigned a unique IP address within the domain at a given time, and at least one of the plurality of network elements within each of at least two of the plurality of domains is assigned an identical IP address, the system comprising
a management station comprising:
a plurality of interfaces established at the management station, each of the plurality of interfaces being one of a virtual interface, a physical interface or combinations thereof, each of said interfaces being assigned a different IP address; and
a management application for communicating with the plurality of interfaces; wherein the management application is configured to:
associate a first of the plurality of domains with a first of the plurality of interfaces;
associate a second of the plurality of domains with a second of the plurality of interfaces, wherein data transmitted from one of the first and second domains to the management application comprises data that has a destination IP address, specified by the management station, which is the IP address of a particular one of the first and second interfaces such that the transmitted data is forwarded at the management station to the respective interface corresponding to the destination IP address, and wherein the management application is further configured to ascertain, without address translations from which of the plurality of domains the data is transmitted based on which of the first and second interfaces receives the forwarded data; and
a router, in communication with the management station, comprising routing information to route the first data to the particular one of the first and second domains based on the source IP address in the first data.

5. The system of claim 4, wherein the management application comprises a single domain manager for centrally managing the plurality of domains.

6. The system of claim 5, wherein the management system comprises:
a display for displaying a consolidated list of entries compiled from data provided by the at least two domains that indicates in each of the entries to which of the plurality of domains a particular entry pertains based upon the interface at which the data is received.

7. The system of claim 4, wherein the management application comprises at least two domain managers each of which manages a different one of the plurality of domains.

8. The system of claim 4, wherein at least two of the plurality of interfaces are virtual interfaces.

9. The system of claim 8, wherein the management station further comprises an additional physical interface that is assigned an IP address, and wherein the virtual IP address assigned to one of the at least two interfaces is the IP address assigned to the additional physical interface.

10. A management system for managing a plurality of computer networks mapped to a plurality of domains, each domain comprising a plurality of network elements that are each assigned a unique IP address within the domain at a given time, and at least one of the plurality of network elements within each of at least two of the plurality of domains is assigned an identical IP address, the management system comprising:
a management station comprising;
a plurality of interfaces established at the management station, each interface being assigned a different IP address; and
a management application for communicating with the plurality of interfaces; wherein the management application is configured to associate a first of the plurality of domains with a first of the plurality of interfaces such that the management application transmits data between the management application and the first domain exclusively through the first of the plurality of interfaces and to associate a second of the plurality of domains with a second of the plurality of interfaces such that the management application transmits data between the management application and the second domain exclusively through the second of the plurality of interfaces and the management station is configured to insert a source IP address, specified by the management station, in the data that is the assigned IP address of the particular one of the first and second interfaces such that no address translation is required; and
a router, in communication with the management station, comprising routing information to route the first data to the particular one of the first and second domains based on the source IP address in the first data.

11. The management system of claim 10, wherein the data comprises an IP data packet.

12. A method of managing a plurality of domains of computer networks at least two of which comprise a respective network element that is assigned an identical IP address, the method comprising the step of:
assigning the plurality of networks to a plurality of domains at a management station such that each network element has a unique IP address within a particular domain at a given time;
establishing a plurality of interfaces for managing the plurality of domains at the management system, each of the plurality of interfaces being one of a virtual interface and a physical interface and having a different IP address that is unique to the plurality of domains:
associating a first of the plurality of domains with a first of the plurality of interfaces;
associating a second of the plurality of domains with a second of the plurality of interfaces;
transmitting first data from the management station to a particular one of the first and second domains by:
transmitting the first data from the management application to a particular one of the first and second interfaces associated with the particular one of the first and second domains to which the data is to be transmitted,
inserting in the first data a source IP address, specified by the management station, which is the assigned IP address of the particular one of the first and second interfaces such that no address translation is required and
routing the first data in accordance with the routing information provided by a router containing said routing information to the particular one of the first and second domains based on the source IP address in the data.

13. The method of claim 12, further comprising the step of:
inserting routing instructions in the first data.

14. The method of claim 12, the method further comprises: routing the first data to the domain associated with the source IP address in the first data.

15. The method of claim 12, further comprising the step of:
- receiving second data that is sent in response to the first data and comprises a destination IP address which is the source IP address of the first data,
- transmitting the second data to a particular one of the first and second interfaces corresponding to the destination IP address, and
- ascertaining from which of the plurality of domains the data is transmitted based which of the first and second virtual interfaces receives the data.

16. The method of claim 15, wherein the first data comprises a network management request, and wherein the second data comprises a response to the network management request.

17. The method of claim 16, further comprising the step of:
- displaying management information at the management station as a consolidated list including an identifier of the domain from which the response originated and a source IP address identifying a network element in the domain from which the response originated.

18. The method of claim 15, further comprising the step of:
- managing each of the plurality of domains with a separate domain manager at the management station;
- ascertaining from which of the plurality of the domains the received management data originated based on the particular one of the plurality of interfaces at which the response is received, and
- forwarding the response to the domain manager for the respective one of the plurality of domains that originated the response as ascertained by the management system based on the particular one of the plurality of interfaces at which the management data is received.

19. The method of claim 12, further comprising the step of:
- managing each of the plurality of domains with a single domain manager at the management station.

20. A method of managing a plurality of computer networks at least two of which comprise a respective network element that is assigned an identical IP address, the method comprising the steps of:
- assigning each of the plurality of computer networks to a plurality of domains at a management station such that each network element has a unique IP address, specified by the management station, within a particular domain at a given time;
- establishing a plurality of interfaces for managing the plurality of domains at the management system, each interface having a different virtual IP address that is unique to the plurality of domains;
- associating a first of the plurality of domains with a first of the plurality of interfaces;
- associating a second of the plurality of domains with a second of the plurality of interfaces; and
- exchanging data between the management system and the plurality of domains, wherein the management application exchanges data with the first of the plurality of domains exclusively through the first interface and the management application exchanges data with the second of the plurality of domains exclusively through the second interface, by inserting a source IP address of the respective domain into said exchanged data, wherein no address translation is required.

21. The method of claim 20, wherein the data that is exchanged comprises an IP data packet transmitted by one of the plurality of network elements at one of the first and second plurality of domains.

22. The method of claim 21, wherein the method further comprises the steps of:
- receiving at the management station the transmitted IP data packet comprising a destination IP address which is the IP address of one of the first and second interfaces,
- forwarding the IP data packet to the one of the interfaces specified by the IP address in the IP data packet, and
- ascertaining from which of the plurality of domains the received IP data packet originated based on the interface at which the IP data packet is received.

23. The method of claim 21, wherein the received IP data packet comprises management data not transmitted in response to a request by the management application, and wherein the method further comprises: configuring at least one of the plurality of domains to transmit the management data to a specified destination IP address which is one of the plurality of IP addresses of the plurality of interfaces at the management station, and ascertaining from which of the plurality of the domains the received management data originated based on the particular one of the plurality of interfaces at which the management data is received.

24. The method of claim 20, further comprising the step of:
- managing each of the plurality of domains with a single domain manager at the management station.

25. The method of claim 24, further comprising the step of:
- displaying management information at the management station, including displaying an identifier of the domain from which the received data originated and a source IP address identifying a network element in the domain from which the received data originated.

26. The method of claim 20, wherein the management application comprises a plurality of domain managers, wherein the data comprises an IP data packet, and wherein the method further comprises: associating each of the plurality of interfaces with a different one of the plurality of domain managers, managing each of the plurality of domains with the associated one of the plurality of domain managers at the management station, forwarding the IP data packet to the one of the plurality of interfaces specified by a virtual IP address in the IP data packet, and forwarding the IP data packet to the associated domain manager for the respective one of the plurality of domains that originated the IP data packet.

* * * * *